United States Patent [19]
Cur et al.

[11] Patent Number: 5,231,847
[45] Date of Patent: Aug. 3, 1993

[54] MULTI-TEMPERATURE EVAPORATOR REFRIGERATOR SYSTEM WITH VARIABLE SPEED COMPRESSOR

[75] Inventors: Nihat O. Cur, Royalton Township, Berrien County; Steven J. Kuehl, Lincoln Township, Berrien County; Douglas D. LeClear, St. Joseph Township, Berrien County; Kenneth P. Chen, Benton Harbor, all of Mich.

[73] Assignee: Whirlpool Corporation, Benton Harbon, Mich.

[21] Appl. No.: 930,104

[22] Filed: Aug. 14, 1992

[51] Int. Cl.$^5$ .............................................. F25B 41/04
[52] U.S. Cl. ........................................ 62/187; 62/197; 62/205; 62/511
[58] Field of Search ................. 62/186, 180, 187, 197, 62/205, 228.4, 511, 326, 430

[56] References Cited

U.S. PATENT DOCUMENTS

| | | | |
|---|---|---|---|
| 2,133,964 | 10/1938 | Buchanan | 62/197 X |
| 2,323,408 | 7/1943 | Miller | 62/205 X |
| 2,745,256 | 5/1956 | Schumacher | 62/430 X |
| 2,914,925 | 12/1959 | Martin | 62/197 |
| 3,108,453 | 10/1963 | Tinkey | 62/200 |
| 3,877,243 | 4/1975 | Kramer | 62/187 X |
| 3,884,663 | 5/1975 | Funaro | 62/511 X |
| 4,015,182 | 3/1977 | Erdman | 62/228.4 X |
| 4,122,687 | 10/1978 | McKee | 62/187 X |
| 4,394,816 | 7/1983 | Voorhis | 62/205 |

*Primary Examiner*—Harry B. Tanner
*Attorney, Agent, or Firm*—Thomas E. Turcotte; Thomas J. Roth; Stephen D. Krefman

[57] ABSTRACT

A refrigeration appliance is provided having at least two refrigeration compartments, each compartment having its own access door. The appliance includes a single evaporator located in a plenum which is selectively in communication with each of the compartments, a single compressor, preferably run by a variable speed motor, and a refrigerant circuit including a series of conduits for providing a flow of refrigerant to the evaporator and compressor. A first restriction device is provided in the conduit connecting the compressor with the evaporator, the restriction device operating at a first pressure level. A second restriction device is also provided in the conduit connecting the compressor with the evaporator, preferably in parallel with the first restriction device, the second restriction device operating at a pressure level higher than the first pressure level. Also, a valve or valves preferably of the latching kind, is positioned in the refrigerant circuit for directing refrigerant to a selected one of the restriction devices, or closing both circuits entirely. A phase change material may be used in the refrigeration circuit, downstream of the restriction devices to improve energy efficiency of the system. Also, with this system, the compartments of the refrigerator appliance can be run either in freezer or in fresh food cooling mode as desired, providing convertible refrigerating compartments.

29 Claims, 4 Drawing Sheets

MULTI-TEMPERATURE EVAPORATOR REFRIGERATOR SYSTEM WITH VARIABLE SPEED COMPRESSOR

BACKGROUND OF THE INVENTION

The present invention relates to refrigeration appliances and more particularly to a method for operating refrigeration appliances having a single evaporator for cooling multiple refrigeration compartments more efficiently.

In typical domestic refrigeration appliances, the appliance oftentimes has two separate compartments which are maintained at different temperatures. For example, there may be a freezer compartment which has a temperature maintained below 0° C. and a fresh food compartment which is maintained at a temperature somewhat above 0° C.

In many commercially available refrigeration devices a single evaporator is used with evaporating pressure of approximately 0-2 psig. Air is circulated over the evaporator simultaneously from both the freezer compartment and the refrigerator compartment. This "mixed" air flow scheme results in dehumidification of the refrigerator compartment and subsequent frost build-up on the single evaporator coil, necessitating a periodic defrost cycle to get rid of the accumulated frost.

Also, using a single evaporator operating at a single evaporating pressure to provide the cooling for two compartments which are maintained at different temperatures results in an inefficient use of the refrigeration system for the higher temperature compartment.

U.S. Pat. No. 4,015,182 disclosed the use of a variable capacity DC ECM compressor and a single evaporator in an automobile air conditioner.

U.S. Pat. No. 4,916,916 discloses the use of a phase change energy storage material in connection with a multiple evaporator refrigeration system.

SUMMARY OF THE INVENTION

The present invention provides a method and apparatus for operating a refrigeration appliance with a single evaporator in which the evaporator circuit operates at different evaporating pressures in which the compressor may be operated at different speeds. In the preferred embodiments disclosed, there are two air flow circuits over the single evaporator, one cooling a freezer compartment and the other cooling a fresh food compartment. During the cooling of the freezer compartment, the evaporator runs at approximately 0-2 psig evaporation pressure due to flow through high resistance capillaries, or other known expansion devices. During the cooling of the fresh food compartment, the evaporator runs approximately at 18-21 psig evaporation pressure due to flow through lower resistance capillaries, at which pressure level, significant energy reductions are achieved.

A single compressor, which may be a variable speed compressor, supplies the refrigerant through the condenser which serves to feed either the high or low pressure expansion devices such as capillary tubes, orifices, expansion valves, etc. Although various circuit options are disclosed, each employs some type of solenoid valve on the capillary tubes to determine which evaporation pressure is used.

In some devices in which the invention is used, a phase change material may be utilized either in association with the evaporator, or within the fresh food compartment in order to reduce the overall energy consumption further by the refrigeration appliance.

The present invention also describes means to have convertible refrigerator compartments. That is, in the preferred embodiment, either compartment can be used as the freezer or the fresh food compartment.

DETAILED DESCRIPTION OF THE PREFERRED EMBODIMENTS

Figure 1:
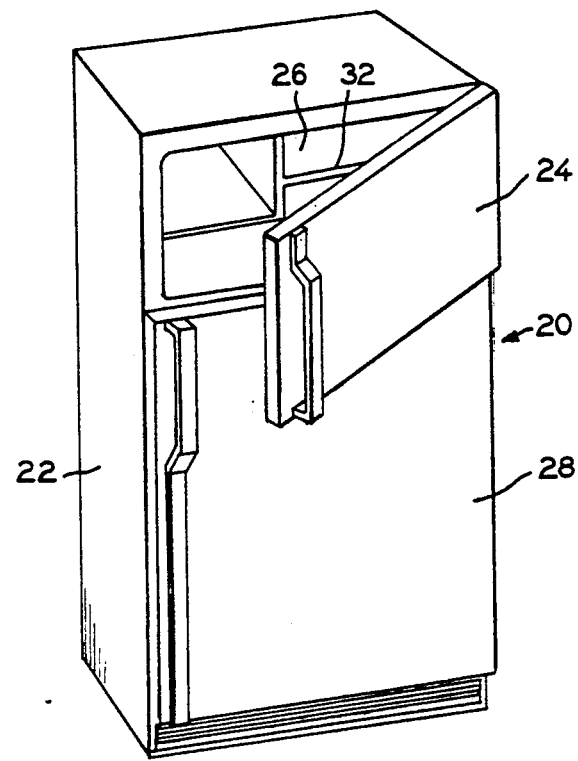
FIG. 1 is a perspective view of a refrigeration appliance in which the method embodying the principles of the present invention may be used.
Figure 2:
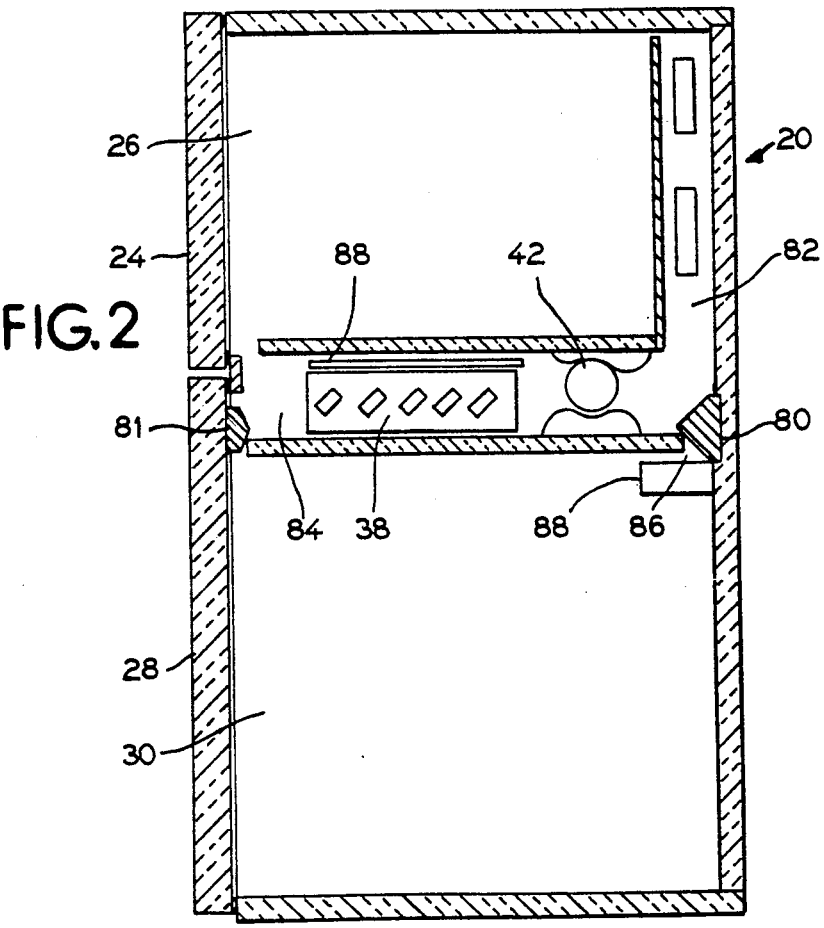
FIG. 2 is a side sectional view of the appliance of FIG. 1.

In FIGS. 1 and 2 there is shown generally a refrigeration appliance at 20 which comprises an exterior cabinet 22 having a first openable door 24 to expose a first interior compartment 26 and a second openable door 28 to expose a second interior compartment 30. Within each of the compartments 26, 30 there may be one or more shelves 32 for receiving food articles. Generally one of the compartments 26, 30, referred to as the freezer compartment, will be maintained at a temperature sufficiently below 0° C. to assure that all of the articles contained within that compartment will be maintained in a frozen state. The other compartment, referred to as a fresh food compartment, generally is maintained somewhat about 0° C. to maintain the items placed therein in a chilled, but not frozen condition. In some situations, both compartments may be maintained above 0° C. so both act as fresh food compartments.

In order to maintain the compartments at the desired temperature levels, a refrigeration device is provided which comprises a compressor 34, a condenser 36, and an evaporator 38 in selective communication with one of the compartments 26, 30. An appropriate air moving device 42, such as a motor driven fan or blower, is provided as needed for circulating air from each of the compartments over the evaporator 38 to maintain a fairly consistent temperature throughout each compartment. The circulating air provided by natural convection in some installed configurations.

A thermostat is provided for each compartment 26, 30 to provide appropriate signal inputs to a control for the appliance as is known.

Figure 3:
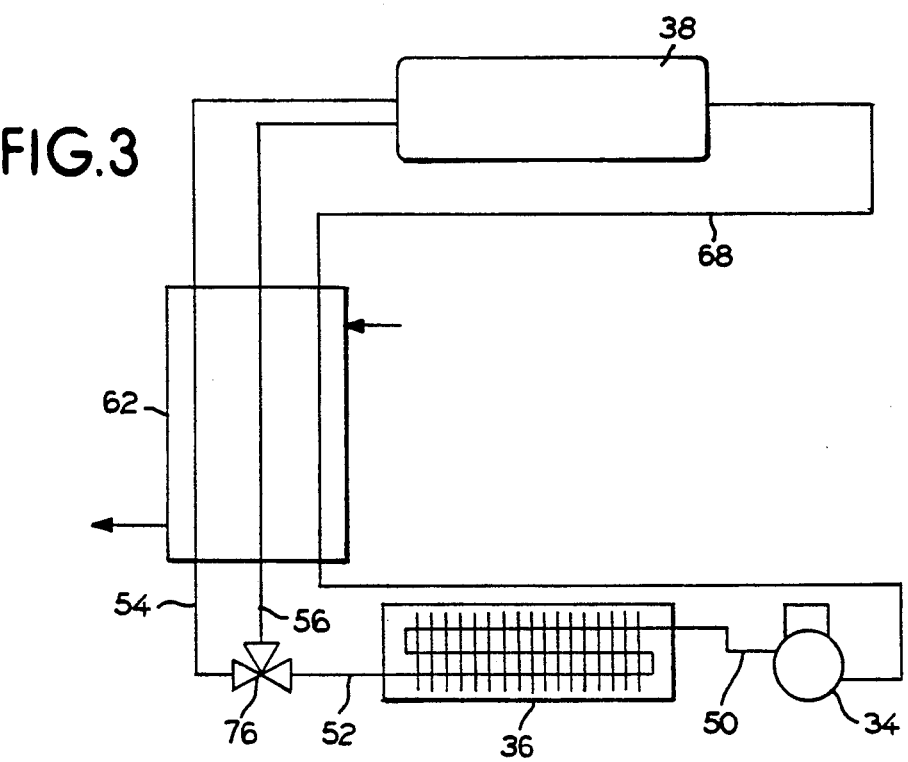
FIG. 3 is a first embodiment of a refrigeration circuit diagram.

In FIG. 3 a refrigeration circuit is illustrated. In this embodiment the single compressor 34 supplies refrigerant through line 50 to the single condenser 36. Refrigerant then flows out of condenser on line 52 and is presented to parallel capillary lines 54, 56. Line 54 is a lower pressure (freezer compartment) capillary and line 56 is a high pressure (fresh food compartment) capillary. At the junction of lines 52, 56 and 54 a three-position solenoid valve 76 is utilized to allow refrigerant flow either through line 56 or line 54, but not both. The third position of the valve 76 is to close both lines 56 and 59. The solenoid valve 76 should preferably be a latching type which requires power for a brief moment (typically a fraction of a second) to change position from one capillary to the other or to the completely closed position.

A regular solenoid valve requires electrical power (5 to 15 watts range) to the coil to remain open or closed (depends on whether the valve is normally closed or open type); therefore necessitating power consumption at least for a certain portion of their operation. Also, some of the power used by the valve coil gets transferred to the refrigerant in the form of heat. Both of these affect the overall refrigeration system energy efficiency to a small extent and reduce the energy savings expected from a sequentially-operated dual temperature evaporator system. The latching solenoid valve (valve 76 in FIG. 3), on the other hand, require only a pulse of (very brief, in terms of miliseconds) electrical input to change position but requiring no further power input to remain open or closed. If the latching type valve is not used, then the valve 76 should preferably be normally closed type, but the invention is not limited to these choices; other combinations are also possible. Lines 54 and 56 pass through a heat exchanger 62 towards evaporator 38. Suction line 68, which exits from evaporator 38, passes through the heat exchange 62 on its return to the compressor 34.

Figure 4:
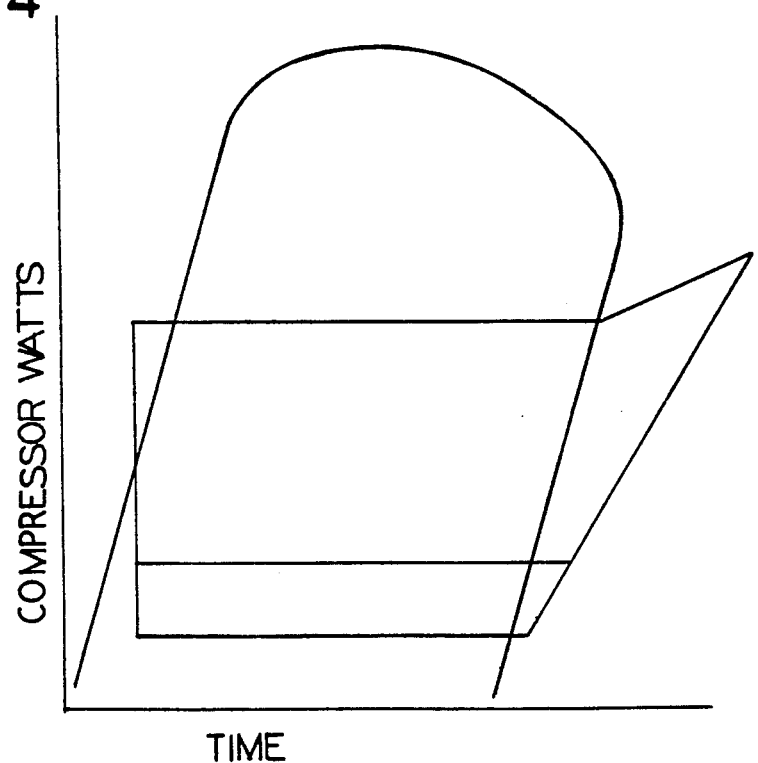
FIG. 4 is a representation of the refrigeration cycle on a pressure-enthalpy diagram.

FIG. 4 is the representation of the sequentially-operated dual temperature evaporator refrigeration system on a pressure-enthalpy diagram. As shown in FIG. 4, FC mode indicates the freezer mode of operation and the evaporation occurs at a lower suction pressure in the evaporator 38 similar to the conventional refrigeration system. RC mode indicates the fresh food compartment cooling and the evaporation takes place at a higher suction pressure in the evaporator 38 thus allowing the same evaporator to be used in a dual temperature mode.

Figure 5:
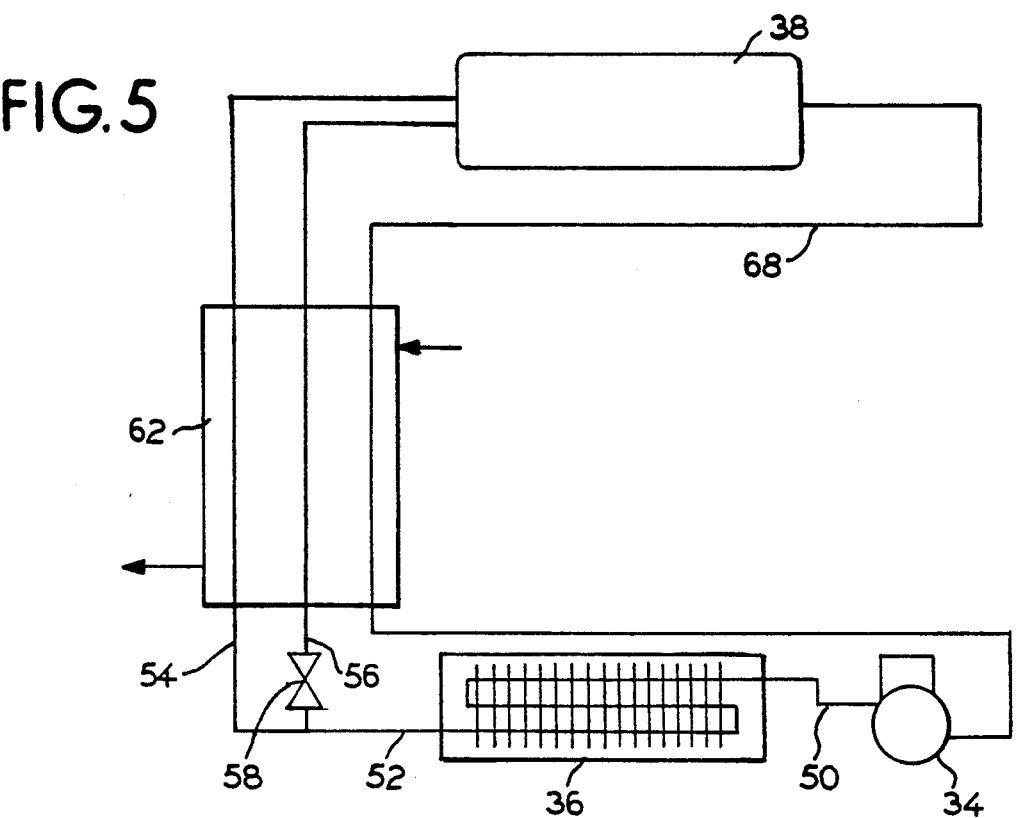
FIG. 5 is a second embodiment of a refrigeration circuit diagram.

A second embodiment of the refrigeration cycle as shown in FIG. 5 contains many of the same components which are identified with the same reference numerals as used in FIG. 3. The primary difference between the embodiment of FIG. 5 and that of FIG. 3 is that an ON/OFF latching valve 58 is utilized at the inlet to line 56 to allow the refrigerant flow through either the capillary on the line 54 alone or through both capillaries on lines 54 and 56. The refrigerant flow is directed through capillary on line 54 when freezer mode of operation is desired. When cooling the fresh food compartment, the refrigerant flow is directed over both capillaries on lines 54 and 56. If the latching type valve is not used, then the valve 58 should preferably be normally open type, but a normally closed valve can also be used with slightly greater energy penalty.

Figure 6:
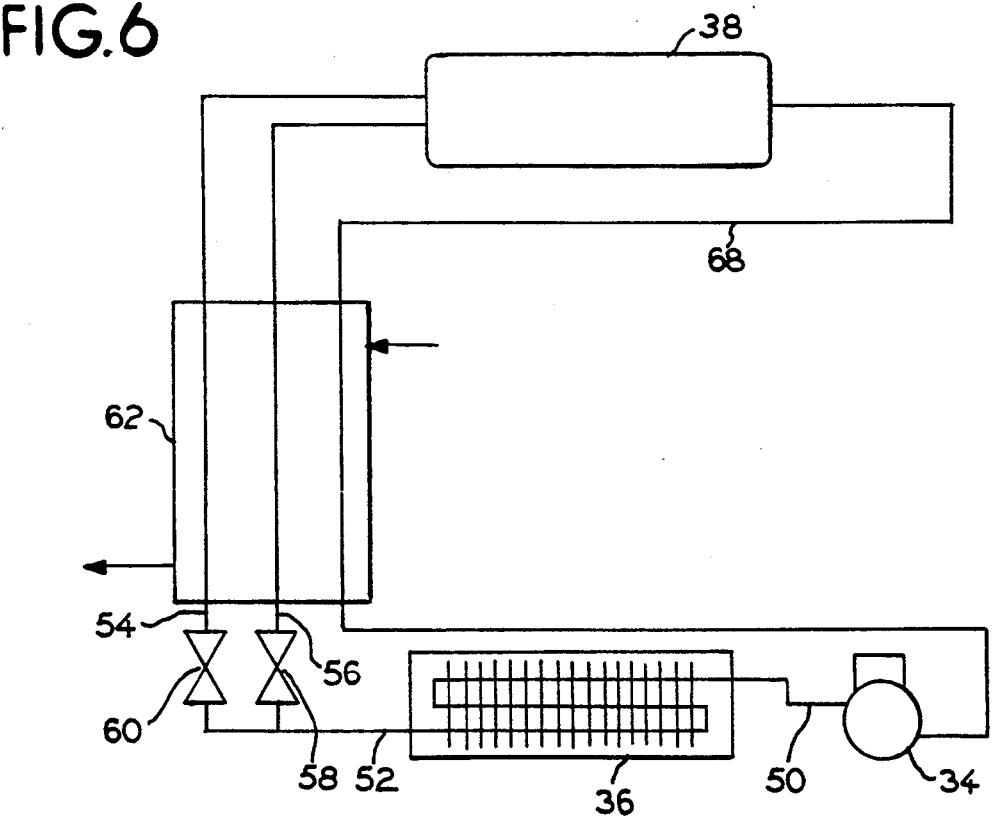
FIG. 6 is a third embodiment of a refrigeration circuit diagram.
Figure 7:
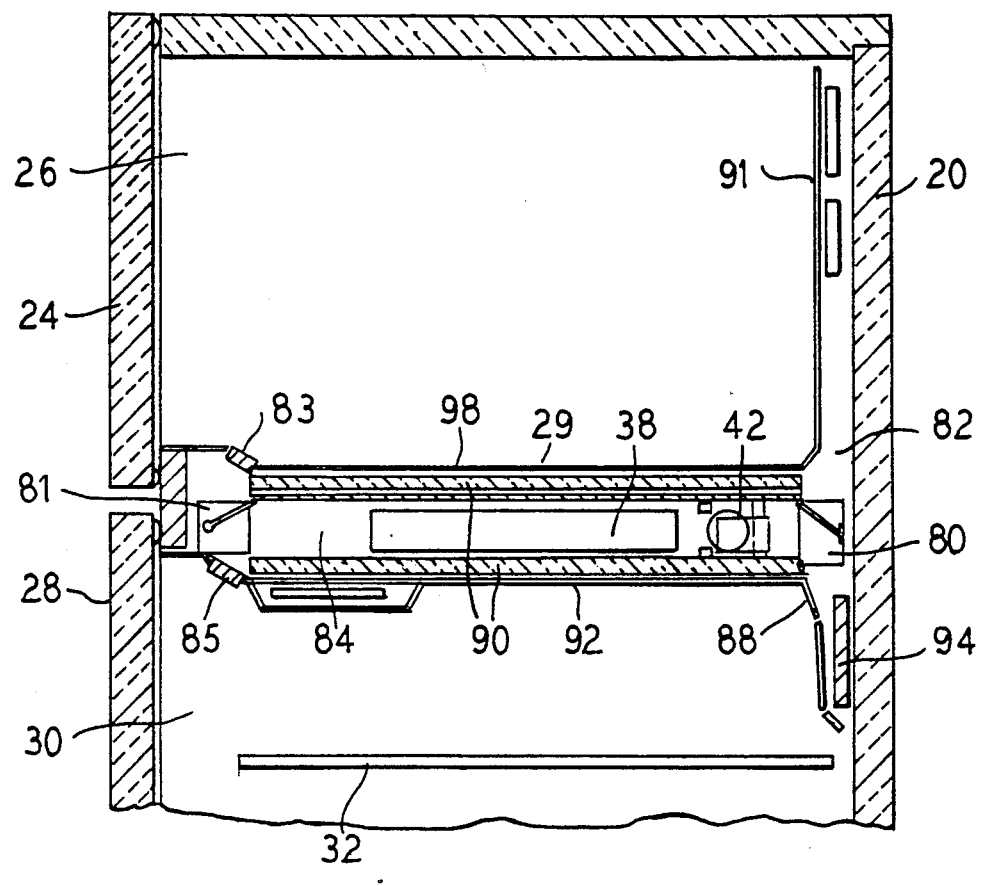
FIG. 7 is a more detailed close-up of FIG. 2.

Again, a third embodiment of the refrigeration cycle represented by FIG. 6 contains many of the same components which are identified with the same numerals as used in FIG. 3. The primary difference between the embodiment of FIG. 6 and that of FIG. 3 is that ON/OFF latching valves 58 and 60 are used to regulate the refrigerant flow to the capillaries on lines 54 and 56 instead of a single three-position valve. If the latching type valves are not used then the valve 58 should be a normally closed type and the valve 60 should preferably also be a normally closed type but a normally open valve can also be used. A more detailed view of the present invention is shown in FIG. 7. Although the dual temperature evaporator 38 is shown to be located in the mullion (separator) section 29 of the refrigerator 22, the present invention is not limited to that location only. Two air dampers 80, 81 are provided to direct the air flow from either the freezer compartment 26 or the fresh food compartment 30 over the evaporator 38 in a sequential manner. The evaporator 38 is housed in the mullion section 29 which is insulated thermally from the compartments 26 and 30 with insulated panels which may contain vacuum panels 90 to allow for compactness. The mullion section 29 is provided with cover plates 92, 98. Air flow from either compartment 26 or 30 through the evaporator 38 is channelled through the freezer compartment air inlet 83 and an air outlet 91 or fresh food compartment air inlet 85 and an air outlet 88. Both air outlets 88 and 91 are provided with air diffusers for uniform air flow distribution to the compartments 26 and 30.

Figure 8:
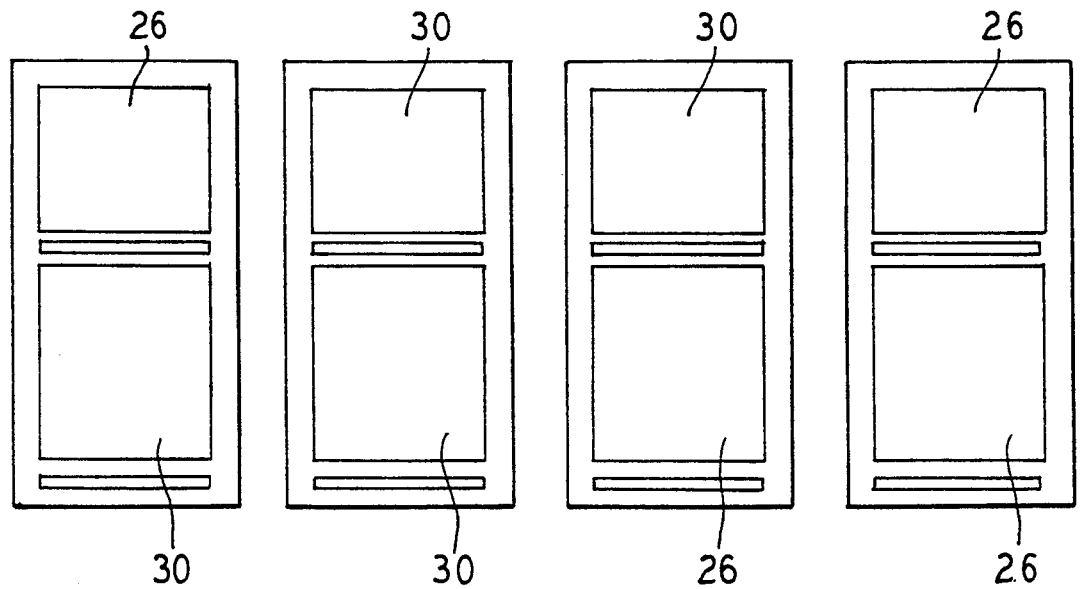
FIG. 8 is a representation of convertible refrigeration compartment concept for a two-compartment refrigerator.

FIG. 8 represents four possible combinations for a convertible compartment refrigerator possible with a dual temperature evaporator refrigeration system. As shown in FIG. 8, the freezer compartment 26 and the fresh food compartment 30 can be converted to the other mode of operation with four possible refrigeration configurations.

During operation of the refrigeration device, if the temperature sensor in the compartment 30, which is maintained above 0° C., calls for cooling, as is known in the art, damper 80 is actuated to block an opening 82 between a plenum 84 in which the evaporator 38 is located and compartment 26. Also, another damper 81 is actuated to block the freezer compartment air inlet 83 to prevent any air leakage from the freezer compartment 26. The compressor 34 is then operated to cause a flow of refrigerant through line 56 through condenser 36, line 52, through the solenoid valve 76 and capillary line 56 to the evaporator 38 and then to return through line 68 to the compressor. This causes the evaporator 38 to become chilled and the air moving device 42 circulates air from the compartment 30 over the evaporator so as to provide cooling for compartment 30. When the temperature sensor becomes satisfied, operation of the evaporator 34 is terminated and fluid flow of refrigerant through the conduits terminates, other than an equalization of pressure across the compressor. If desired, the three-position latching solenoid valve 76 may be closed to both capillaries when the compressor 34 is not operating in order to prevent migration of refrigerant to the evaporator during periods of non use.

If the refrigerant migration was not allowed during off cycle, when cooling of either compartment is required, the pressure equalization can be achieved by opening the latching valve 76 to the high pressure capillary for approximately three minutes or so just prior to an on cycle.

When the temperature sensor in compartment 26 (acting as a freezer compartment) calls for cooling, the damper 80 is actuated to a position to block an opening 86 to the compartment 30 and to open the opening 82 to compartment 26. Also, the other damper 81 is actuated to block the fresh food compartment air inlet 85 positively and to open the freezer compartment air inlet 83. The compressor 34 is then operated and latching solenoid valve 76 is energized briefly to block off capillary 56 and allow the refrigerant fluid to flow from line 52 through low pressure capillary 54 and then into evaporator 38 before returning to compressor 34 through line 68. The air moving device 42 is operated causing a flow of air through the plenum 84 and over the evaporator 38 from compartment 26 to provide the desired cooling. When the temperature sensor in compartment 26 has become satisfied, the compressor operation will terminate and the latching solenoid valve 76 will be energized briefly to close both lines 54 and 56. The pressure equalization across the compressor can be achieved as explained before. Also, both dampers 80 and 81 would be actuated to prevent migration of the relatively cooler air from compartment 26 by closing the freezer compartment air inlet 83 and the opening 82.

To further enhance the efficiency of the refrigeration system, since the compressor runs more efficiently and provides substantially more refrigeration cooling capacity at a higher evaporating pressure such as that used to cool compartment 30 by flow through high pressure capillary 56, the excess capacity of the compressor can be utilized to solidify a phase change material 88 which may either be associated directly with the evaporator 38 or positioned within the compartment 30. By allowing the phase change material to store the excess cooling capacity, the refrigeration system can be run even at a higher suction pressure than what is possible without such a material.

The phase change material is to be selected so as to change phase, preferably from a liquid to a solid, at a temperature below that desired for the fresh food compartment. A phase change material such as water, which changes phase between liquid and solid at 0° C. would be such a material.

If the phase change material is associated directly with the evaporator, then the phase change material can be used during the cooling of both the freezer compartment as well as the fresh food compartment. In such an arrangement, the compressor 34 would be run, without operating any air moving device, in order to solidify the phase change material at a constant temperature. The relatively high evaporating temperature associated with use of the higher pressure capillary tubes 56 could be utilized to increase efficiency of the compressor. Once the phase change occurs and the evaporator temperature goes below the phase change temperature, the compressor 34 would continue to run until the freezer temperatures are reached. To cool the freezer compartment, the compressor 34 and air moving device 42 are run simultaneously to cool the freezer compartment 26 by diverting all of the air flowing over the evaporator 38 to the freezer compartment.

Once the freezer compartment temperature sensor is satisfied, the compressor 34 would be turned off and only the air moving device 42 would be operated and the baffles 80 and 81 would be moved so that air flowing over the evaporator 38 would be directed only into the fresh food compartment 30. The evaporator temperature would rise, but not above the phase change material solidification temperature, until all of the phase change material becomes liquid. If enough phase change material is present, the evaporator temperature may not rise above the solidification temperature of the phase change material. If the temperature does rise above the phase change temperature, then the compressor 34 would also resume operation and run simultaneously with the air moving device 42 until the fresh food compartment temperature sensor has been satisfied. However, due to the phase change material associated with the evaporator 38, the evaporator temperature would never get too cold to run inefficiently to cool the fresh food compartment 30.

While the compressor 34 is off during the off-cycle and the air dampers 80 and 81 open to the fresh food compartment 30, the evaporator surface would be warmed enough to substantially remove any frost build-up since the fresh food compartment is maintained above 0° C. This may possibly eliminate or reduce the necessity of defrost heaters which are required in some commercially available refrigeration devices.

During the freezer mode operation, the air flow is confined to flow only in the evaporator plenum 84 and the freezer compartment 26. Conversely, during fresh food operation, the air flow is routed only through the plenum 84 and the fresh food compartment 30. No mixing of freezer and fresh food air is allowed. This reduces frost accumulation on the coil during freezer operation. Frost which does collect can be eliminated through several means. Sublimation is possible during fresh food cooling or during the off cycle by leaving the dampers 80 and 81 opened to the fresh food compartment air and by allowing refrigerant to migrate to the evaporator 38. This would raise the coil temperature sufficiently to melt off frost accumulation. Again, the need for a defrost heater may thus be eliminated or reduced.

If the phase change material is decoupled from the evaporator 38 further energy efficiencies can be attained. Again, a single evaporator 38 would be used sequentially in either a freezer (low pressure) or fresh food (high pressure) mode. The air moving device 42 could be operated at two speeds, or variable speeds, to handle the differences in capacities existing between the high and low evaporator pressure modes.

If the phase change material 94 is used in this manner, it should be used on an extension of the suction line 68 positioned outside of the plenum 84 to remove the phase change material from the air stream during freezer mode operation. This reduces the freezer cycle load and places the phase change material inside the fresh food compartment 30 for better natural convection during the fresh food off cycle.

A further energy efficiency could be obtained by using a variable capacity compressor 34 in order to have the compressor and air moving device 42 run at varying speeds to match the varying cooling load of the refrigeration device compartments. The typical single speed compressor used in refrigeration devices is sized to deliver far more cooling capacity than is needed to match the steady state heat gain into the cabinet and pull-downs resulting from the introduction of a variable load, i.e., changing ambient, warm food and door openings. Thus, single speed systems over cool the compartments and then undergo a prolonged off period. This situation is made worse when the refrigeration system is operated in a sequential manner with a dual temperature evaporator. At higher pressures, when operating in the fresh food mode, the excess cooling capacity more than doubles, necessitating either a downsized compressor and/or a larger evaporator (or an evaporator with a phase change material). Instead by using a variable capacity compressor 34, (i.e. with a variable speed dc ecm motor), the load can be matched with the compressor running to provide higher suction pressures at much reduced cooling capacities and air moving device 42 (possibly, using a pwv dc motor) running at lower speeds, thus using much less energy than a single speed system. Further energy reductions can be obtained by over driving the cooling each compartment to allow sequencing operation between the fresh food, freezer and, potentially more, compartments served by a single evaporator 38. When the system is sequenced to a different mode, i.e., from freezer to fresh food, the evaporator/suction pressure can be correspondingly matched using the correct expansion/capillary circuit.

By employing proportional dampers 80, 81 for a two compartment cabinet, the following options for a compartment operation are made available to the user. The dampers would be able to either dedicate the chilled air to either compartment at the correct temperature, or split the air stream to allow for fast recovery and modulated compartment temperatures.

This system also benefits from the possibility of a fresh food air defrost as described above.

The sequentially-operated dual temperature-evaporator system described earlier preferably with a variable speed compressor, can offer also convertibility of the refrigerated compartments 26 and 30. That is, for example, by proper choice of air damper position selection and an appropriate capillary tube, the freezer compartment 26 can be made to run as a fresh food compartment just like the compartment 30. Likewise, the fresh food compartment 30 can be made to run like a freezer compartment similar to the original freezer compartment 26 by using appropriate controls. In fact, this type of refrigeration system would be best run using functional electrical controls 87 as shown in FIG. 7. As illustrated in FIG. 8, the convertibility of the compartments offer four distinct configurations for a two-compartment refrigeration appliance.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A refrigeration appliance having at least two refrigeration compartments, each compartment having its own access door, comprising:
   a single evaporator located in a plenum which is in communication with each of said compartments;
   a single compressor;
   a refrigerant circuit comprising a series of conduits for providing a flow of refrigerant to said evaporator and compressor; and
   a first restriction device in said conduit connecting said compressor with said evaporator, said restriction device operating at a first pressure level;
   a second restriction device in said conduit connecting said compressor with said evaporator, said second restriction device operating at a pressure level higher than said first pressure level; and
   valve means in said refrigerant circuit for directing refrigerant to a selected one of said restriction devices.

2. A refrigeration appliance according to claim 1, further including means for selectively opening and closing communication between said plenum and each of said compartments.

3. A refrigeration appliance according to claim 2, wherein said means for selectively opening and closing comprises baffles which open communication between said plenum and one of said compartments when they close communication with each of said other compartments.

4. A refrigeration appliance according to claim 1, further including a phase change material positioned downstream of said restriction devices in said refrigeration circuit.

5. A refrigeration appliance according to claim 1, wherein said first compartment is maintained at a temperature below 0° centigrade.

6. A refrigeration appliance according to claim 1, wherein said second compartment is maintained at a temperature above 0° centigrade.

7. A refrigeration appliance according to claim 1, wherein said compressor is driven by a multiple speed motor.

8. A refrigeration appliance according to claim 7, wherein said multiple speed motor is a variable speed motor.

9. A refrigeration appliance according to claim 1, including an air moving device in said plenum for circulating air from said compartments over said evaporator.

10. A refrigeration appliance according to claim 9, wherein said air moving device is powered by an adjustable speed motor.

11. A refrigeration appliance according to claim 1, wherein said first restriction device is a capillary tube.

12. A refrigeration appliance according to claim 1, wherein said second restriction device is a capillary tube.

13. A refrigeration appliance according to claim 1, wherein said second restriction device is connected in parallel with said first restriction device between said compressor and said evaporator.

14. A refrigeration appliance according to claim 1, wherein said valve means comprises a three-position latching valve positioned between said compressor and said first and second restriction devices.

15. A refrigeration appliance according to claim 1, wherein said valve means comprises a two-position latching valve positioned between said compressor and said second restriction device.

16. A refrigeration appliance according to claim 15, further including a second two-position latching valve positioned between said compressor and said first restriction device.

17. A refrigeration appliance according to claim 2, including control means for said opening and closing means to permit selection of either of said compartments to communicate with said plenum when either of said restriction devices is being utilized.

18. A refrigeration appliance having at least two refrigeration compartments, each compartment having its own access door, comprising:
   a single evaporator located in a plenum communicating with each of said compartments;
   a single condenser;
   a single compressor;
   a refrigerant circuit comprising a series of conduits for providing a flow of refrigerant to said evaporator, said condenser and compressor; and
   a first restriction device in said conduit between said condenser and said evaporator, said first restriction device operating at a first pressure level to maintain said first compartment at a temperature below 0° centigrade;

a second restriction device in said conduit between said condenser and said evaporator, said second restriction device operating at a pressure level higher than said first pressure level to maintain said second compartment at a temperature above 0° centigrade;

valve means in said refrigerant circuit for directing refrigerant to a selected one of said restriction devices from said condenser; and means for selectively opening and closing communication between said plenum and each of said compartments.

19. A refrigeration appliance according to claim 18, wherein said means for selectively opening and closing comprises movable baffles which open communication between said plenum and one of said compartments when then close communication with each of said other compartments.

20. A refrigeration appliance according to claim 18, wherein further including a phase change material positioned downstream of said restriction devices in said refrigeration circuit.

21. A refrigeration appliance according to claim 18, wherein said compressor is driven by a variable speed motor.

22. A refrigeration appliance according to claim 18, including an air moving device in said plenum for circulating air from said compartments over said evaporator.

23. A refrigeration appliance according to claim 22, wherein said air moving device is powered by an adjustable speed motor.

24. A refrigeration appliance according to claim 18, wherein said first and second restriction devices are each a capillary tube.

25. A refrigeration appliance according to claim 18, wherein said second restriction device is connected in parallel with said first restriction device between said condenser and said evaporator.

26. A refrigeration appliance according to claim 18, wherein said valve means comprises a three-position latching valve positioned between said condenser and said first and second restriction device.

27. A refrigeration appliance according to claim 18, wherein said valve means comprises a two-position latching valve positioned between said compressor and said second restriction device.

28. A refrigeration appliance according to claim 27, further including a second two-position latching valve positioned between said compressor and said first restriction device.

29. A refrigeration appliance according to claim 18, including control means for said opening and closing means to permit selection of either of said compartments to communicate with said plenum when either of said restriction devices is being utilized.

* * * * *